US010058997B1

(12) United States Patent
Chao (10) Patent No.: US 10,058,997 B1
(45) Date of Patent: Aug. 28, 2018

(54) SPACE EXTRAPOLATION FOR ROBOT TASK PERFORMANCE

(71) Applicant: X Development LLC, Mountain View, CA (US)

(72) Inventor: Crystal Chao, San Francisco, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 37 days.

(21) Appl. No.: 15/184,725

(22) Filed: Jun. 16, 2016

(51) Int. Cl.
*B25J 9/16* (2006.01)
*G06F 3/01* (2006.01)
*B25J 19/02* (2006.01)

(52) U.S. Cl.
CPC ............. *B25J 9/1661* (2013.01); *B25J 9/161* (2013.01); *B25J 9/163* (2013.01); *B25J 9/1697* (2013.01); *B25J 19/021* (2013.01); *G06F 3/017* (2013.01); *B25J 9/1664* (2013.01); *B25J 9/1679* (2013.01); *B25J 19/023* (2013.01); *G05B 2219/39466* (2013.01); *G05B 2219/40014* (2013.01); *G05B 2219/40116* (2013.01); *G05B 2219/45063* (2013.01)

(58) Field of Classification Search
CPC ........ B25J 9/1697; B25J 9/1661; B25J 9/161; B25J 9/163; B25J 9/1664; B25J 19/021; B25J 19/023; B25J 9/1679; G05B 2219/39466; G05B 2219/40014; G05B 2219/45063; G05B 2219/40116; G06F 3/017
See application file for complete search history.

(56) References Cited

U.S. PATENT DOCUMENTS

| 2006/0184272 | A1* | 8/2006 | Okazaki | B25J 9/1697 700/245 |
| 2006/0195226 | A1* | 8/2006 | Matsukawa | B25J 9/162 700/245 |
| 2010/0092032 | A1* | 4/2010 | Boca | B25J 9/1679 382/103 |
| 2013/0346348 | A1* | 12/2013 | Buehler | B25J 9/0087 706/12 |
| 2015/0012426 | A1* | 1/2015 | Purves | G06Q 30/0623 705/41 |

(Continued)

OTHER PUBLICATIONS

Levine, S. et al. "Natural User Interface for Robot Task Assignment." In Proceedings of RSS workshop on Human-Robot Collaboration for Industrial Manufacturing. 2014; 5 pages.

(Continued)

*Primary Examiner* — Jason Holloway
(74) *Attorney, Agent, or Firm* — Middleton Reutlinger (57) ABSTRACT

Methods, apparatus, systems, and computer-readable media are provided for enabling users to approximately identify a space within an environment inhabited by a plurality of objects that user wishes for a robot to manipulate. In various implementations, an approximation of a space within an environment may be identified based on user input. The actual space within the environment may then be extrapolated based at least in part on the approximation and one or more attributes of the environment. A plurality of objects that are co-present within the space and that are to be manipulated by a robot may be identified. The robot may then be operated to manipulate the identified plurality of objects.

13 Claims, 5 Drawing Sheets

(56) References Cited

U.S. PATENT DOCUMENTS

| | | | | |
|---|---|---|---|---|
| 2015/0190925 A1* | 7/2015 | Hoffman | ............... | B25J 9/161 |
| | | | | 700/257 |
| 2015/0314449 A1* | 11/2015 | Wang | ............... | B25J 9/1689 |
| | | | | 700/259 |
| 2016/0109954 A1* | 4/2016 | Harris | ............... | G06F 3/017 |
| | | | | 345/156 |

OTHER PUBLICATIONS

Becker, M. et al. "GripSee: A Gesture-Controlled Robot for Object Perception and Manipulation." Autonomous Robots, 6(2), 1999; pp. 203-221.

Teller, S. et al. "A Voice-Commandable Robotic Forklift Working Alongside Humans in Minimally-Prepared Outdoor Environments." In Robotics and Automation (ICRA), May 2010 IEEE International Conference on (pp. 526-533). IEEE.

Holz, Dirk, et al. "Active Recognition and Manipulation for Mobile Robot Bin Picking." In Gearing Up and Accelerating Cross-Fertilization Between Academic and Industrial Robotics Research in Europe; Springer International Publishing, 2014. pp. 133-153.

Nieuwenhuisen, M. et al. "Mobile Bin Picking With an Anthropomorphic Service Robot." In Robotics and Automation (ICRA), 2013 IEEE International Conference on (pp. 2327-2334). IEEE.

Raskar, R. et al. "Interactive Pick and Place Robot Control using Image Processing Method." International Journal of Engineering and Computer Science ISSN:2319-7242; vol. 3; Iss. 9; Sep. 2014; pp. 8033-8036.

* cited by examiner

SPACE EXTRAPOLATION FOR ROBOT TASK PERFORMANCE

BACKGROUND

Some robots may be controlled using relatively abstract commands such as "pick up object at location A and carry to location B." This level of abstraction may be well-suited for specialized robots operating in relatively predictable environments such as factories. However, it may be less well-suited for controlling general-purpose robots in less predictable environments such as disaster zones, public spaces, outdoor environments, or even homes/offices. For example, a child's room may be cluttered with multiple heterogeneous toys that need to be picked up and put away in order for the room to be deemed "clean." Dirty dishes may need to be carried from the dinner table to the sink and/or loaded into a dishwasher. Requiring an operator to individually instruct the robot to pick up each dish and take it to the sink would be inefficient and frustrating for the operator.

SUMMARY

The present disclosure is generally directed to methods, apparatus, and computer-readable media (transitory and non-transitory) for facilitating a higher level of abstraction in robot control that enables users to roughly identify a space within an environment inhabited by a plurality of objects (homogeneous or heterogeneous) that user wishes for a robot to manipulate (e.g., pick up and put away, clean, tidy up, reorient, physically arrange by size, etc.). For example, a robot and/or control system may receive, as input from an operator, an "approximation" of a space that contains multiple co-present items that the operator wishes the robot to manipulate. The system may then extrapolate an actual defined space based at least on the approximation provided by the operator. The system/robot may then identify any objects within (or in some cases, overlapping) the defined space that satisfy criteria provided by the operator, and manipulate those objects pursuant to the operator's command.

An operator may provide an approximation of the space in various ways. In some implementations, a vision sensor on a robot (or elsewhere) may be employed to detect one or more operator gestures made by an operator, e.g., in conjunction with one or more contemporaneous oral commands received from the operator, to indicate a space within an environment in which the robot is to manipulate multiple objects. For example, in some implementations, an operator may gesture to a space with one or more arms while uttering one or more keywords or semantically-identified cues, such as pointing to a table top and saying "please take these dishes to the sink." The robot may detect the simultaneous pointing and an operator utterance that, through semantic processing, is determined to refer to multiple objects ("these dishes"). Based on the operator's gestures, an approximation of the space may be identified.

In some implementations, a direction in which the operator is pointing may be used to identify the approximation. For example, image processing may be used to project a vector along the operator's pointed finger until it intersects a surface. Additionally or alternatively, in some implementations, multiple vectors may be defined at the extremes of the operator gesture, and those vectors may then be used as boundaries for the approximation. In some implementations, if the operator's appendage (e.g., finger, hand, etc.) is sufficiently close to the surface they are gesturing towards, e.g., within a predefined range (e.g., x centimeters), then the tip of the appendage may be projected directly onto the surface (e.g., rather than projecting a ray along the appendage). In other implementations, a centroid of the operator's appendage (e.g., a centroid of the operator's hand) may be detected and used to identify the approximation, in addition to or instead of an extremity of the appendage. In some implementations, a vector may be detected from the operator's eyes (or more generally, their head) to the tip or centroid of the gesturing appendage, and then onto the surface being approximated.

In other implementations, rather than visually detecting operator gestures, an operator may operate a touch screen to provide an approximation of the space of interest. For example, the operator may point to a single point on a distinct surface rendered on a touch screen, such as a depicted tabletop, and utter "move everything on this table to the trash." Or, the operator may draw a region of interest on the touch screen to approximately identify the area of interest.

However the operator approximation of the space is provided, an actual, well-defined space in its entirety may then be extrapolated based at least in part on the operator's approximation. For example, in some implementations, edge detection may be performed on visual data captured by the vision sensor to detect one or more edges associated with a surface associated with the operator's approximation, and a boundary of the space may be defined as corresponding to the detected edge. In other implementations, a three-dimensional ("3D") model utilized by the robot may be used to identify the surface and determine its spatial boundaries. In yet other embodiments, a predefined "logical" space of a room, such as between two couches, in the "play corner," "in front of the TV," etc., may extrapolated from the operator's approximation.

Once the actual defined space is extrapolated from the approximation, a plurality of objects within or at least overlapping the space may be identified and manipulated in accordance with the operator's commands. In some implementations, the operator may specify criteria for objects to be manipulated, such as color, size, etc., and only objects within the space satisfying those criteria may be manipulated.

In some implementations, a computer implemented method may be provided that includes the steps of: identifying, based on user input, an approximation of a space within an environment; extrapolating the space within the environment based at least in part on one or more attributes of the environment and the approximation; identifying a plurality of objects that are co-present within the space, wherein the plurality of objects are to be manipulated by a robot; and operating the robot to manipulate the identified plurality of objects.

This method and other implementations of technology disclosed herein may each optionally include one or more of the following features.

In some implementations, identifying the approximation may include temporally synchronizing user input with audio data sensed by one or more audio sensors. In various implementations, identifying the approximation may include detecting, based on visual data sensed by one or more vision sensors, an operator gesture associated with user identification of space. In various implementations, the operator gesture may be detected in the visual data based at least in part by identifying one or more frames of the visual data that correspond temporally with one or more utterances captured in the audio data that are associated with user identification of space. In various implementations, the method may further include performing semantic processing of the audio data to associate the one or more utterances with user identification of space.

In various implementations, the method may further include identifying, based on the approximation, at least one surface in the environment that is associated with the space. In some implementations may further include: detecting one or more edges associated with the at least one surface; and defining one or more boundaries of the space based at least in part on the one or more detected edges. In various implementations, detecting the one or edges may include performing edge detection on visual data sensed by one or more vision sensors. In various implementations, detecting the one or edges may be based on one or more surfaces identified within a three-dimensional model of the environment available to the one or more processors.

In various implementations, the approximation may include a point within a distinct surface of the environment, and an entirety of the distinct surface may be extrapolated from the point. In various implementations, the approximation of the space may be received as input at a touch screen that depicts at least a portion of the environment. In various implementations, the at least one surface may include a horizontal surface. In various implementations, the at least one surface may include a vertical surface to which the plurality of objects are secured or mounted. In various implementations, the plurality of objects may be homogenous or heterogeneous.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
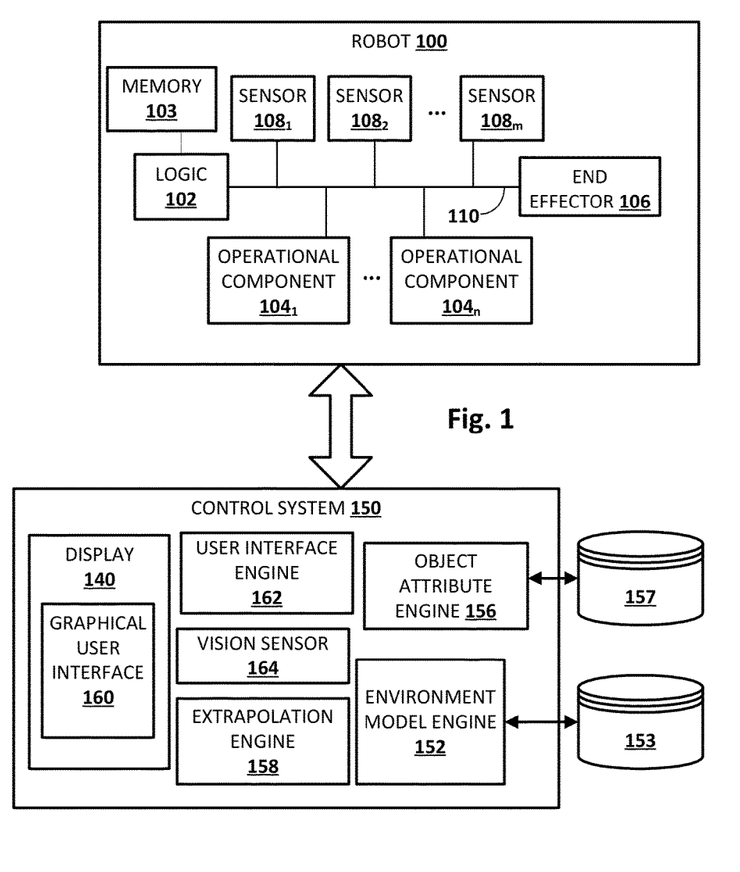
FIG. 1 schematically depicts an example environment in which disclosed techniques may be employed, in accordance with various implementations.

FIG. 1 is a schematic diagram of an example environment in which selected aspects of the present disclosure may be practiced in accordance with various implementations. A robot 100 may be in communication with a control system 150. Robot 100 may take various forms, including but not limited to a telepresence robot (e.g., which may be as simple as a wheeled vehicle equipped with a display and a camera), a robot arm, a humanoid, an animal, an insect, an aquatic creature, a wheeled device, a submersible vehicle, an unmanned aerial vehicle ("UAV"), and so forth. In various implementations, robot 100 may include logic 102. Logic 102 may take various forms, such as a real time controller, one or more processors, one or more field-programmable gate arrays ("FPGA"), one or more application-specific integrated circuits ("ASIC"), and so forth. In some implementations, logic 102 may be operably coupled with memory 103. Memory 103 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

In some implementations, logic 102 may be operably coupled with one or more operational components $104_{1-n}$, one or more end effectors 106, and/or one or more sensors $108_{1-m}$, e.g., via one or more buses 110. As used herein, "operational components" 104 of a robot may refer to actuators, motors (e.g., servo motors), joints, shafts, gear trains, pumps (e.g., air or liquid), pistons, drives, or other components that may create and/or undergo propulsion, rotation, and/or motion. Some operational components such as many joints may be independently controllable, although this is not required. In some instances, the more operational components robot 100 has, the more degrees of freedom of movement it may have.

As used herein, "end effector" 106 may refer to a variety of tools that may be operated by robot 100 in order to accomplish various tasks. For example, some robots may be equipped with an end effector 106 that takes the form of a claw with two opposing "fingers" or "digits." Such as claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, vacuums (e.g., to clean floors), force-torque sensors, cutting tools, deburring tools, welding torches, containers, trays, and so forth. In some implementations, end effector 106 may be removable, and various types of modular end effectors may be installed onto robot 100, depending on the circumstances.

Sensors 108 may take various forms, including but not limited to 3D laser scanners or other 3D vision sensors (e.g., stereographic cameras used to perform stereo visual odometry) configured to provide depth measurements, two-dimensional cameras, light sensors (e.g., passive infrared), force sensors, pressure sensors, pressure wave sensors (e.g., microphones), proximity sensors (also referred to as "distance sensors"), depth sensors, torque sensors, barcode readers, radio frequency identification ("RFID") readers, radars, range finders, accelerometers, gyroscopes, compasses, position coordinate sensors (e.g., global positioning system, or "GPS"), speedometers, edge detectors, and so forth. While sensors $108_{1-m}$ are depicted as being integral with robot 100, this is not meant to be limiting. In some implementations, sensors 108 may be located external to, but may be in direct or indirect communication with, robot 100, e.g., as stand-alone units or as part of control system 150.

Control system 150 may include one or computing systems connected by one or more networks (not depicted) that control operation of robot 100 to various degrees. An example of such a computing system is depicted schematically in FIG. 5. In some implementations, control system 150 may be operated by an operator (not depicted) to exert a relatively high level of control over robot 100, e.g., in real time in response to signals received by a user interface engine 162 and/or one or more readings from one or more sensors 108. In other implementations, control system 150 exerts less direct control over robot 100. For example, control system 150 may provide robot 100 with a high level task such as "pick up objects located in area A and move them to area B." Logic 102 on robot 100 may convert such high level tasks into robot action, e.g., by translating one or more high level tasks into a plurality of motion primitives executable by robot 100. In some implementations, control system 150 may include a display 140 (e.g., CRT, LCD, touch screen, etc.) on which a graphical user interface 160 operable to remotely control robot 100 may be rendered.

Various modules or engines may be implemented as part of control system 150 as software, hardware, or any combination of the two. For example, in FIG. 1, control system 150 includes an environment model engine 152, an object attribute engine 156, an extrapolation engine 158, and the aforementioned user interface engine 162. Environment model engine 152 may be configured to maintain, e.g., in index 153, one or more two-dimensional ("2D") and/or 3D models of one or more environments in which robot 100 operates. In some implementations, the 3D models stored in index 153 may be so-called "voxel" based 3D models that include a 3D grid of voxels to represent the environment, although this is not required.

Object attribute engine 156 may be configured to store, e.g., in index 157, records, models, and or identification techniques/routines associated with of various objects that may be acted upon by robot 100. For example, object attribute engine 156 may store in index 157 one or more models associated with objects that robot 100 may be called to act upon. Objects may take any form, including but not limited to dishware, toys, tools, boxes, pallets, electronic equipment, valves, joints, mechanical parts, and so forth.

While robot 100 and control system 150 are depicted separately in FIG. 1, this is not meant to be limiting. In various implementations, one or more aspects (e.g., modules, engines, etc.) depicted in FIG. 1 as implemented on one of robot 100 or control system 150 may be implemented on the other, may be distributed across both, and/or may be distributed across one or both in combination with other components not depicted in FIG. 1. In implementations where robot 100 and control system 150 are separate, they may communicate over one or more wired or wireless networks (not depicted) or using other wireless technology, such as radio, Bluetooth, infrared, etc. In other implementations, control system 150 may be implemented entirely or in part using logic 102 of robot 100.

Robot 100, and more particularly, logic 102, may be configured to make a variety of decisions based on data stored in indices 153 and 157. For example, suppose robot 100 is instructed to travel through a particular environment to a destination. Data about the environment stored in index 153 may be used by logic 102 to calculate a path through the environment that avoids known obstacles and/or hazards. Or, suppose robot 100 is instructed to move a table in a room. Logic 102 may determine based on data stored in index 157 that an object is on top of the table (at least as far as robot 100 is aware). Using that information, robot 100 may take appropriate action, such as by moving the table in a manner that avoids knocking the object off, by removing the object first before moving the table, or by refusing to move the table and raising an alert to one or more users about the object.

To make such decisions, robot 100 may access data stored in indices 153 and 157 in various ways. In some implementations, data stored in index 153 and/or index 157 may be synchronized to mirrored locations in memory 103 of robot 100 periodically (e.g., hourly, daily, every few minutes), e.g., as a batch download. In some implementations, data stored in index 153 and/or 157 may be made available to logic 102 of robot 100 on demand. In some implementations, robot 100 may maintain (e.g., in memory 103) its own indices storing records of the environmental model and any obstacles or hazards.

Extrapolation engine 158 may be configured to determine (e.g., infer), based on an approximation of a space within an environment provided by an operator, and further based on one or more attributes of the environment or objects contained there stored in indices 153/157, the actual space within the environment to which the operator was referring. For example, an operator may provide, e.g., via graphical user interface 160, a rough approximation of a table top that contains a plurality of objects to be acted upon (e.g., manipulated, moved, etc.) by robot 100. the operator's rough indication may include, for instance, the operator touching a point on display 140 (which may be a touch screen) that depicts the table top. Additionally or alternatively, the operator may move her finger on the touch screen to draw a rough approximation of the region-of-interest. Based on the operator's rough approximation, and on an environmental model of the table stored in index 153, extrapolation engine 158 may automatically extrapolate the entire table top as the space containing the objects to be acted upon by robot 100. Examples of extrapolation will be described in more detail below.

Control system 150 may in some implementations include an vision sensor 164. Vision sensor 164 may take various forms, such as a 3D laser scanner or other 3D vision sensor (e.g., stereographic camera used to perform stereo visual odometry) configured to provide depth measurements, a two-dimensional camera, and so forth. In various implementations, graphical user interface 160 may render an image feed received from vision sensor 164. The operator may be able to interact with graphical user interface 160 as described above to provide an approximation of a space within the environment that contains a plurality of objects to be acted upon by robot 100. In other implementations, one or more sensors 108 that is integral with robot 100 may provide the image feed that is rendered on graphical user interface 160.

Additionally or alternatively, one or more vision sensors, such as a vision sensor 108 integral with robot 100 or vision sensor 164 that forms part of control system 150, may detect one or more gestures made by an operator to provide an approximation of a space in which multiple objects are to be acted upon by robot 100. For instance, a user may generally point or otherwise gesture towards a defined space such as an area rug and provide a command such as "pick up all the toys on the rug." Boundaries of the actual area rug may be extrapolated based on the operator's approximation and/or attributes of the rug (e.g., its edges detected using image processing). In addition to instead of detecting gestures operators providing using their hands and/or arms, in some implementations, other operator movements may be detected, such as detecting a focus of the operator's eyes, detecting a gesture or operator pose involving the operator's leg (e.g., "pick up all toys from the rug I'm standing on"), and so forth.

Figure 2:
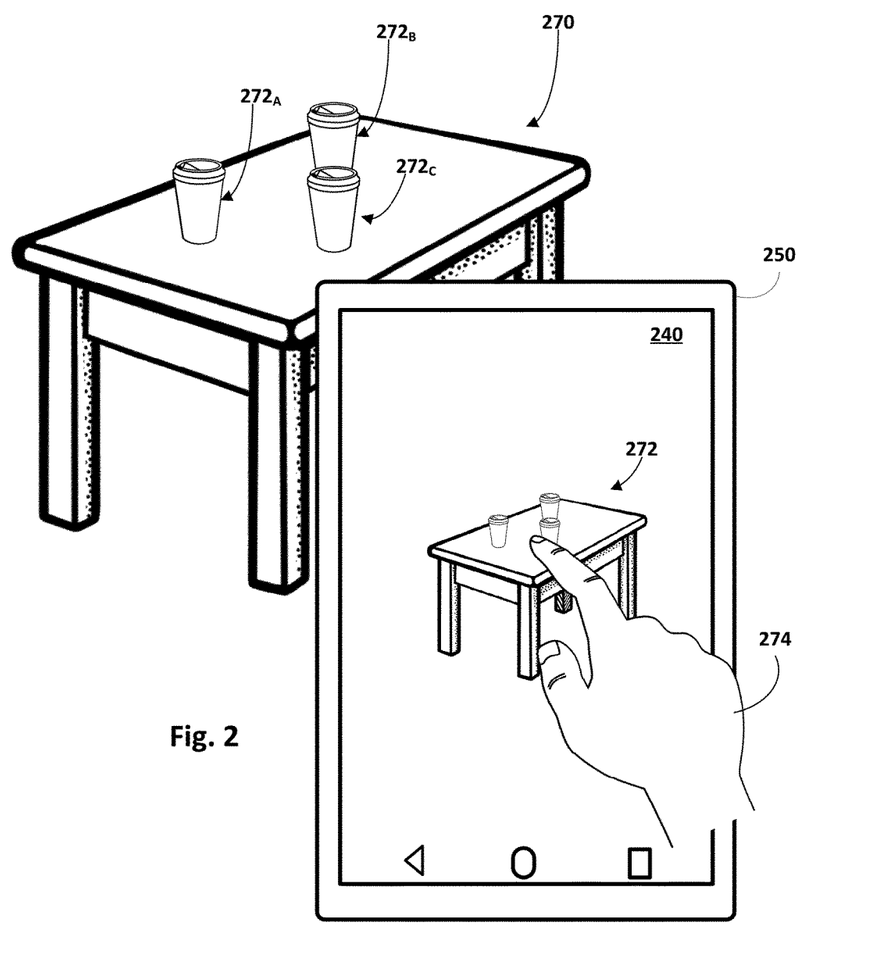
FIG. 2 depicts a simple example of how disclosed techniques may be employed using a touch screen-based computing device, in accordance with various implementations.

FIG. 2 depicts one non-limiting example of how disclosed techniques may be employed. In FIG. 2, an environment in which a robot (not depicted) operates includes a table 270. On top of table 270 are three objects 272$_{A-C}$, which in this example take the form of cups. A robot control system 250 in the form of a smartphone or tablet includes a touch screen display 240 that renders a graphical user interface (not specifically referenced in FIG. 2) that includes a rendition of visual data received, for instance, from a front facing camera (not visible in FIG. 2, see 164 in FIG. 1) of control system 250. In this instance, the rendition includes a depiction 272 of table 270 because the front facing camera is currently pointed at table 270. In some implementations, a different depiction would be rendered on display 240 if the front facing camera were pointed elsewhere. In other implementations, the depiction 272 may be a static depiction captured by the operator sometime in the past.

In this example, the operator may interact with control system 250 using his or her hand 274 to select a point on touch screen display 240. Here, the operator has touched a point on the top of the depiction of table 270. Simultaneously or contemporaneously with pointing at the table top, the operator may provide additional input in the form of one or more commands for a robot to act upon a plurality of objects on table top. For example, the operator may provide speech input such as "Please remove all these cups from the table." Additionally or alternatively, the operator may interact with one or more graphical elements (not depicted) to cause the robot to perform the same or similar task.

The operator's touching of a point that corresponds to the table top may be interpreted, e.g., by extrapolation engine 158, as an approximation of a space within the environment in which the robot is to act upon a plurality of objects. Starting with this approximation, extrapolation engine 158 may extrapolate and/or otherwise infer the space the operator was referring to in various ways.

In some implementations, extrapolation engine 158 may consult with environment model engine 152 to identify the table as part of the environment. For example, the operator's commands may provide some indication, in addition to the approximation of the space, as to what models environment model engine 152 should seek out. If the operator mentioned a "table," then environment model engine 152 may focus its search on tables known to inhabit the environment. In some implementations, records or models of tables or other environmental features stored in index 153 may have been, for instance, previously observed by one or robots while performing simultaneous localization and mapping ("SLAM") in the environment. In other implementations, the environmental model may be manually provided, e.g., by one or more operators, e.g., in the form of one or more computer-aided design ("CAD") models.

Once the object associated with the space approximation provided by the operator is identified, e.g., in index 153, environment model engine 152 may provide that data to extrapolation engine 158. For example, environment model engine 152 may provide one or more records or models associated with table 270, its dimensions, etc. Based on data received from environment model engine 152, extrapolation engine 158 may extrapolate, from the model, the entire tabletop (e.g., all the planar space bounded by defined edges of the table top).

In other implementations, extrapolation engine 158 may rely on data obtained from sources other than environment model engine 152. For example, in some implementations, extrapolation engine 158 may perform image processing techniques such as edge detection on the visual data received from vision sensor 164 and/or one or more vision sensors 108 integral with robot 100. The edge detection may be used, e.g., by extrapolation engine 158, to extrapolate an entire surface of the table top. In some implementations, extrapolation engine 158 may rely on data from both environment model engine 152 and vision sensor(s) 164/108 to extrapolate the tabletop, e.g., by correlating results of each technique with the other.

Once the top surface of table 270 is extrapolated, object attribute engine 156 may identify, e.g., based on SLAM data previously gathered by one or more robots and/or based on image data received from vision sensor(s) 164/108, a plurality of objects that are co-present within the extrapolated space. In this example, object attribute engine 156 may identify objects 272$_{A-C}$. In some implementations, object attribute engine 156 may utilize one or more models or other data from index 157 to identify the objects. In FIG. 2, for instance, object attribute engine 156 may employ one or more models associated with cups to identify objects 272$_{A-C}$, so that they approximate masses/sizes can be determined.

If the operator specified a particular type of object in the space that should be acted upon by the robot, then object attribute engine 156 may discard any objects that do not conform with models associated with the particular type of object. For example, if the operator command was "please remove all cups from this table," then other objects that do not match cup models, such as telephones, computers, etc., may be disregarded as objects that the robot is not to act upon. Once the objects to be acted upon are identified, the robot (again, not depicted in FIG. 2) may be operated, e.g., by logic 102 to manipulate the identified plurality of objects. In this example, the robot would remove the cups from table 270.

Figure 3:
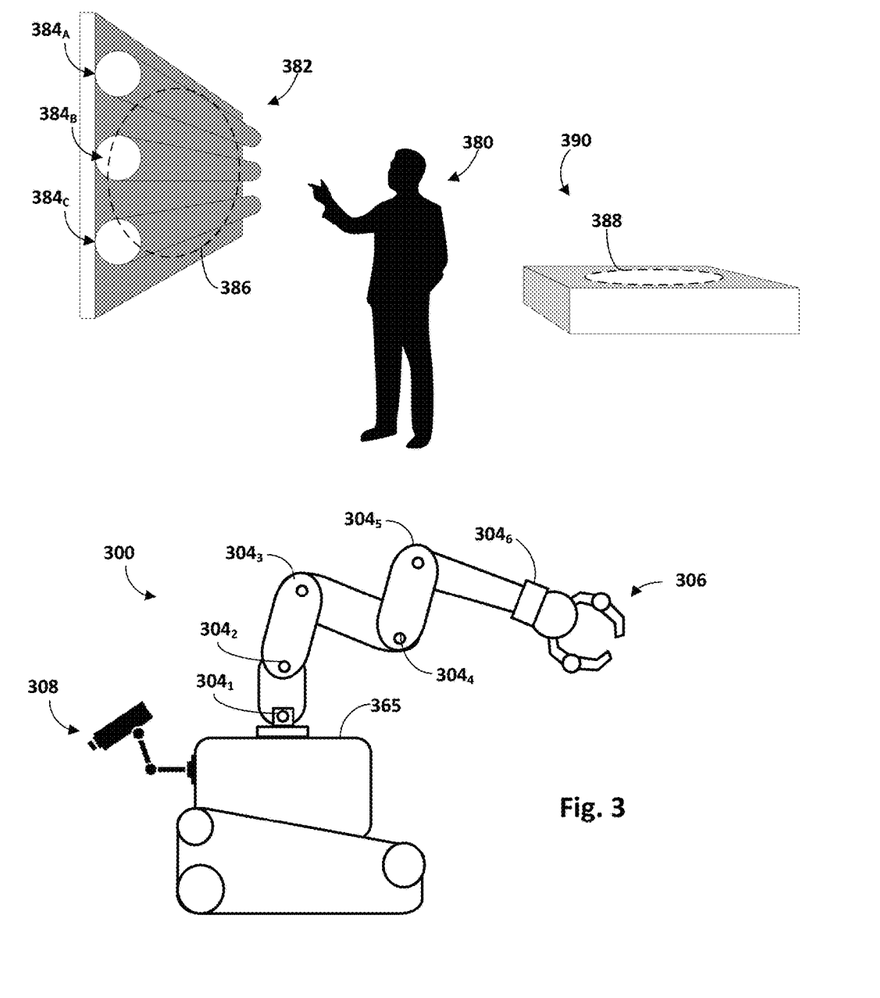
FIG. 3 depicts a simple example of how disclosed techniques may be employed using gestures, in accordance with various implementations.

An operator may identify a space in which multiple co-present objects are to be acted upon by a robot in other ways as well. In FIG. 3, for instance, an operator 380 controls a robot 300 having a plurality of operational components 304$_{1-6}$ and a gripper-style end effector 306 using voice commands and visual gestures. Robot 300 is equipped with at least one vision sensor 308 that takes the form of a camera. Vision sensor 308 captures one or more images (e.g., video) of operator 380 and/or an environment in which robot 300 operates.

Operator 380 is seen pointed generally at a first surface 382 that takes the form of a vertical surface on which a plurality of objects 384$_{A-C}$ are secured, mounted, or affixed. Objects 384$_{A-C}$ in this example take the form of homogeneous cylinders, and may be, for instance, pipes (the type of object is not important for this example). In particular, operator 380 is making a pointing gesture that is observed by vision sensor 308 to approximately outline the area 386 indicated by the dashed circle. For example, operator 380 may point to the center of the circle, or may draw a rough outline of the circle using his finger. Image processing may be used to project a vector along the operator's pointed finger until it intersects a surface. Or, image processing may be used to project a vector from the operator's head/eyes through their finger to the surface. Additionally or alternatively, in some implementations, multiple vectors may be defined at the extremes of the operator's gesture, and those vectors may then be used as boundaries for the approximation. In some implementations, if the operator's appendage (e.g., finger, hand, etc.) is sufficiently close to the surface they are gesturing towards, e.g., within a predefined range (e.g., x centimeters), then the tip of the appendage may be projected directly onto the surface (e.g., rather than projecting a ray along the appendage). In other implementations, a centroid of the operator's appendage (e.g., a centroid of the operator's hand) may be detected and used to identify the approximation, in addition to or instead of an extremity of the appendage. However the operator provides the approximation, area 386 forms an approximation of a space in the environment that is inhabited by a plurality of objects 384$_{A-C}$ that operator 380 wishes robot 300 to act upon.

In some implementations, the gesture by operator 380 may be detected in visual data captured by vision sensor 308 based at least in part by identifying one or more frames of the visual data that correspond temporally with one or more utterances captured in audio data (e.g., recorded by one or more sensors 108) that are associated with user identification of space. For example, at the same time as operator 380 makes the gesture, operator 380 (or another operator in the area) may speak one or more commands to robot 300, such as "remove these objects from the wall." In various implementations, this audio data may be sensed by one or more audio sensors (not depicted in FIG. 3, see 108 in FIG. 1) that are integral with robot 300 or otherwise located within earshot. The audio data may be temporally synchronized with the operator's gesture to identify the approximation of the space that contains objects to be acted upon by robot 300, as well as to determine what actions robot 300 is to take vis-à-vis objects 384$_{A-C}$.

In some implementations, semantic processing may be performed on the audio data, e.g., by logic (e.g., 102) of robot 300 or elsewhere, to associate the one or more utterances with user identification of space. In some implementations, objects that are visually identified in visual data captured by vision sensor 308 may be used to aide in semantic processing. For example, suppose one or pipes or other objects are identified, e.g., by object attribute engine 156, based on visual data captured by vision sensor 308. These identified objects may be used by a semantic processor to narrow down the semantic meaning of one or more tokens parsed from a command spoken by operator 380. Similar semantic processing techniques may be employed when using a smartphone or tablet computer to identify an approximation of space in which multiple objects are to be acted upon by a robot, e.g., as shown in FIG. 2.

As described above, logic (e.g., 102) of robot 300 or logic contained elsewhere (e.g., on the cloud, extrapolation engine 158) may extrapolate the entirety of surface 382 from approximation area 386. In some implementations, extrapolation engine 158 may extrapolate the entire surface 382 based on one or more 2D or 3D models or other data provided by environment model engine 152. Additionally or alternatively, extrapolation engine 158 may extrapolate the entire surface 382 by performing image processing on visual data captured by vision sensor 308, e.g., using edge detection or other similar techniques.

Once the entire surface 382 is extrapolated, a plurality of objects contained at least partially within, if not entirely within, the boundaries of surface 382 may be identified, e.g., by object attribute engine 156 based on a comparison of visual data captured by vision sensor 308 to one or more object models contained in index 157. While the objects 384$_{A-C}$ in FIG. 3 (as well as objects 272$_{A-C}$ in FIG. 2) were roughly homogenous, this is not meant to be limiting. Techniques described herein may be used to cause a robot to act upon a plurality of heterogeneous objects in a space as well. As noted above, a subset of objects contained in an extrapolated space may be identified based on one or attributes of an operator's command. For example, "Remove all objects" would cause a robot to act upon any object contained at least partially within an extrapolated space. "Remove cups" would cause a robot to identify and selectively remove only those objects inhabiting the extrapolated space that matched one or more objects models for cups.

Techniques described herein may also be used to extrapolate a space in a robot's environment for purposes other than acting upon a plurality of objects. For example, in FIG. 3, operator 380 may identify an approximation 388 of a second space, in this instance a second, horizontal surface 390 (e.g., a pallet), as a destination for objects 384$_{A-C}$ (e.g., accompanied by a spoken command such as "place objects over here"). Much in the same way that operator 380 provided a gesture to define area 386 to serve as an approximation of surface 382, operator 380 may gesture generally towards second surface 390 to provide an approximation 388. From the approximation 388, extrapolation engine 158 may utilize one or more of the techniques described above to extrapolate the entire second surface 390 as a space in which robot 300 should place objects 384$_{A-C}$ it removes from first surface 382.

More generally, an operator may provide an approximation of a space in which a robot is to perform a variety of operations in addition to or instead of acting upon multiple objects. For example, an operator could gesture towards an area (e.g., a portion of a landscape predefined as a garden) and instruct a robot to apply water and/or other gardening chemicals at various intervals. The garden may be extrapolated using techniques similar to those described above (e.g., edge detection that detects where mulch stops and grass starts), or the garden may be predefined, e.g., manually and/or based on data gathered by one or more robots previously during SLAM.

As the above example demonstrates, extrapolation engine 158 may utilize other techniques besides edge detection and geometric environmental models to extrapolate, from an operator-provided approximation of a space, the actual space. For example, upon purchasing a robot, a homeowner may predefine spaces that the homeowner wishes the robot to be aware of, e.g., using a smartphone or tablet computer. For example, in an open floor plan, there may not be easily-detectable environmental barriers between spaces that are logically defined as separate rooms. Accordingly, the homeowner may manually define areas such as a "kitchen," "living room," etc. Later, when the homeowner wishes the robot to take some action in these spaces, the homeowner may gesture generally towards (or click a touch screen depicting a portion of) a predefined space and instruct the robot to take some action. The robot may extrapolate the space from the homeowner's provided approximation by associating the predefined space with the operator's gesture (or interaction with a touch screen), e.g., using homeowner-defined boundaries associated with the predefined space. Similar techniques may be used by operators/robots in industrial settings, e.g., to extrapolate areas such as "receiving," "shipping," "assembly," "robot workspace," etc.

Figure 4:
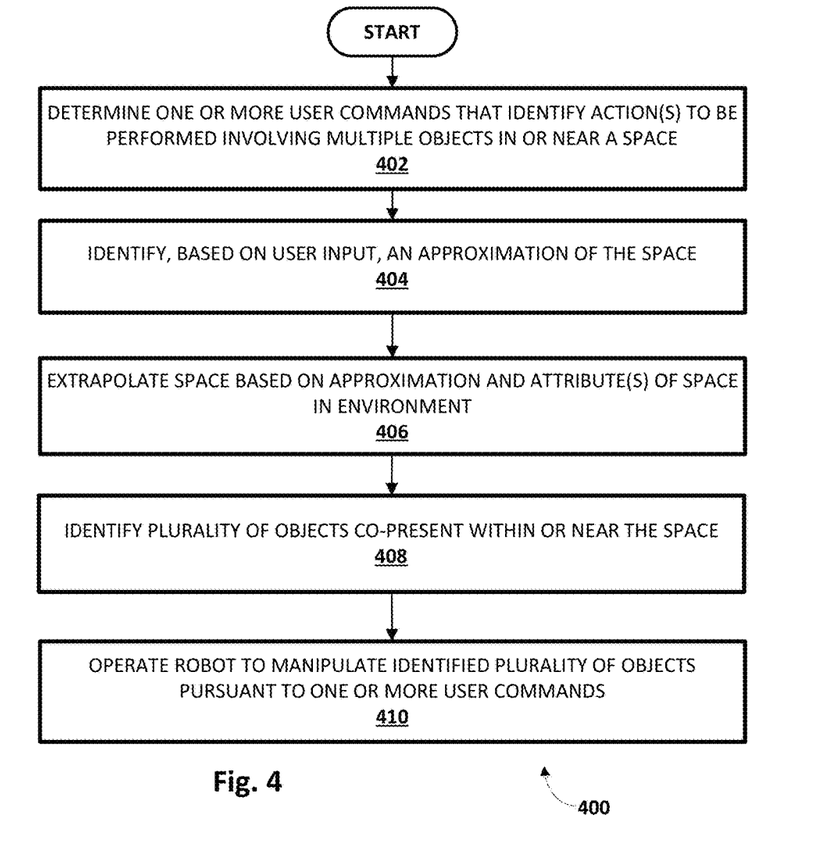
FIG. 4 depicts an example method of practicing disclosed techniques, in accordance with various implementations.

Referring now to FIG. 4, an example method 400 of enabling users to roughly identify a space within an environment inhabited by a plurality of objects that user wishes for robot 100 to act upon is described. For convenience, the operations of the flowchart are described with reference to a system that performs the operations. This system may include various components of various computer systems. For instance, some operations may be performed at robot 100, while other operations may be performed by one or more components of control system 150. Moreover, while operations of method 400 are shown in a particular order, this is not meant to be limiting. One or more operations may be reordered, omitted or added.

At block 402, the system may determine one or more user commands that identify one or more actions to be performed by a robot (e.g., 100, 300) that involve multiple objects in or near a space. In some implementations, the operator may utter a statement that is captured by an audio sensor and converted to one or more commands. In some implementations, the operator may provide one or more commands using a graphical user interface.

Contemporaneously or simultaneously with determination of the operator command(s), at block 404, the system may identify, based on various aspects of the operator input, an approximation of the space. For example, and as was described above, an operator may operate computing device such as a smartphone, tablet, or laptop to provide an approximation of a space, e.g., by clicking or drawing a region of interest within a rendition of the space. Additionally or alternatively, the operator may make one or more gestures that are captured by one or more visions sensors that may or may not be integral with the robot. The one or more gestures may include the operator pointing to a space, generally identifying a region (e.g., by moving her hand in a circle or other shape), and so forth. As noted above, the operator's input that provides the approximation of the space may be temporally synchronized with user commands indicating the task to be performed by the robot.

At block 406, the system may extrapolate a space based at least in part on the approximation identified at block 404. In some implementations, the extrapolation may be further based at least in part on one or more attributes of the environment. For example and as noted above, edge detection or other similar techniques may be used to detect surface boundaries in visual data captured by one or more vision sensors. Such surfaces may include but are not limited to table tops, area rugs, driveways, conveyor belts, counter tops, gardens, and so forth. Or, in some implementations, surfaces may be detecting using one or more environmental models provided by environment model engine 152. In yet other implementations, the extrapolation may be based at least in part on arbitrarily spaces (e.g., "kitchen," "living room," "play corner," etc.).

In some implementations, at block 408, the system may identify a plurality of objects that are co-present within or at least near the extrapolated space. In some implementations, only objects that are entirely contained within the extrapolated space may be identified. In some implementations, only objects that are at least partially within the extrapolated space may be identified. In yet other implementations, objects that were contained with, or within a predefined range of, an extrapolated space may be identified. If the user specified criteria that the objects should meet (e.g., "cups," "paper items," etc.), then only objects meeting those criteria may be identified. At block 410, the system may operate the robot to manipulate the plurality of objects identified at block 408 pursuant to the one or more commands determined at block 402.

Figure 5:
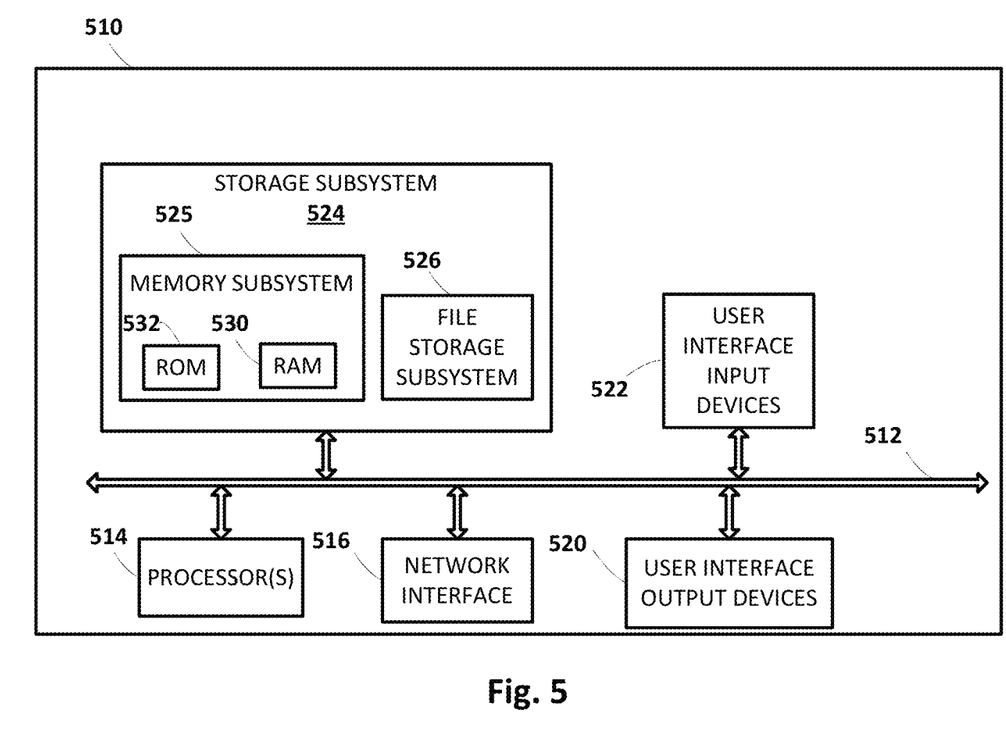
FIG. 5 schematically depicts an example architecture of a computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the operator or to another machine or computer system.

Storage subsystem 524 stores programming and data constructs that provide the functionality of some or all of the modules described herein. For example, the storage subsystem 524 may include the logic to perform selected aspects of method 400, and/or to implement one or more aspects of robot 100 or control system 150. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a CD-ROM drive, an optical drive, or removable media cartridges. Modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
   identifying, by one or more processors, an approximation of a space within an environment, wherein identifying the approximation comprises:
      detecting, based on visual data sensed by one or more vision sensors, an operator gesture associated with user identification of the space within the environment, and
      temporally synchronizing the operator gesture with audio data sensed by one or more audio sensors,
      wherein the operator gesture is detected in the visual data based at least in part by identifying one or more frames of the visual data that correspond temporally with one or more utterances captured in the audio data that are associated with user identification of the space;
   extrapolating, by one or more of the processors, the space within the environment based on the approximation and one or more attributes of the environment;
   identifying, by one or more of the processors, a plurality of objects that are co-present within the space, wherein the plurality of objects are to be manipulated by a robot; and
   operating, by one or more of the processors, the robot to manipulate the identified plurality of objects.

2. The computer-implemented method of claim 1, further comprising performing, by one or more of the processors, semantic processing of the audio data to associate the one or more utterances with user identification of the space.

3. The computer-implemented method of claim 1, further comprising identifying, by one or more of the processors, based on the approximation, at least one surface in the environment that is associated with the space.

4. The computer-implemented method of claim 3, further comprising:
   detecting, by one or more of the processors, one or more edges associated with the at least one surface; and
   defining, by one or more of the processors, one or more boundaries of the space based at least in part on the one or more detected edges.

5. The computer-implemented method of claim 4, wherein detecting the one or more edges comprises performing edge detection on visual data sensed by one or more vision sensors.

6. The computer-implemented method of claim 4, wherein detecting the one or more edges is based on one or more surfaces identified within a three-dimensional model of the environment available to the one or more processors.

7. The computer-implemented method of claim 1, wherein the operator gesture comprises a pointed finger, and the approximation comprises a point at the end of a vector projected along the pointed finger until it intersects a distinct surface of the environment, wherein an entirety of the distinct surface is extrapolated from the point.

8. The computer-implemented method of claim 1, wherein the at least one surface is a horizontal surface.

9. The computer-implemented method of claim 1, wherein the at least one surface is a vertical surface to which the plurality of objects are secured or mounted.

10. The computer-implemented method of claim 1, wherein the plurality of objects are heterogeneous.

11. A system comprising one or more processors and memory operably coupled with the one or more processors, wherein the memory stores instructions that, in response to execution of the instructions by the one or more processors, cause the one or more processors to:
   identify, based on user input, an approximation of a space within an environment, wherein identification of the approximation comprises:
      detection, based on visual data sensed by one or more vision sensors, of an operator gesture associated with user identification of the space within the environment, and
      temporally synchronization of the operator gesture with audio data sensed by one or more audio sensors,
      wherein the operator gesture is detected in the visual data based at least in part by identifying one or more frames of the visual data that correspond temporally with one or more utterances captured in the audio data that are associated with user identification of the space;
   extrapolate, based on one or more attributes of the environment, the space within the environment based at least in part on the approximation;
   identify a plurality of objects that are co-present within the space, wherein the plurality of objects are to be manipulated by a robot; and
   operate the robot to manipulate the identified plurality of objects.

12. The system of claim 11, further comprising instructions to identify, based on the approximation, at least one surface in the environment that is associated with the space.

13. At least one non-transitory computer-readable medium comprising instructions that, in response to execution of the instructions by a computing system, cause the computing system to perform the following operations:
   identifying, based on user input, an approximation of a space within an environment, wherein identifying the approximation comprises:
      detecting, based on visual data sensed by one or more vision sensors, an operator gesture associated with user identification of the space within the environment, and
      temporally synchronizing the operator gesture with audio data sensed by one or more audio sensors,
      wherein the operator gesture is detected in the visual data based at least in part by identifying one or more frames of the visual data that correspond temporally with one or more utterances captured in the audio data that are associated with user identification of the space;
   extrapolating the space within the environment based at least in part on one or more attributes of the environment and the approximation;
   identifying a plurality of objects that are co-present within the space, wherein the plurality of objects are to be manipulated by a robot; and operating the robot to manipulate the identified plurality of objects.

* * * * *